United States Patent
Ito et al.

(10) Patent No.: US 8,591,780 B2
(45) Date of Patent: Nov. 26, 2013

(54) THERMAL INSULATION AND METHOD OF PRODUCING THE SAME

(75) Inventors: Yasuo Ito, Hamamatsu (JP); Yoshihiko Goto, Yokohama (JP); Isami Abe, Hamamatsu (JP); Shigeru Nakama, Hamamatsu (JP); Takahiro Ohmura, Hamamatsu (JP)

(73) Assignee: Nichias Corporation, Tokyo (JP)

( * ) Notice: Subject to any disclaimer, the term of this patent is extended or adjusted under 35 U.S.C. 154(b) by 132 days.

(21) Appl. No.: 12/903,459

(22) Filed: Oct. 13, 2010

(65) Prior Publication Data

US 2011/0091721 A1  Apr. 21, 2011

(30) Foreign Application Priority Data

Oct. 16, 2009  (JP) .................................. 2009-239327

(51) Int. Cl.
- B29C 59/00 (2006.01)
- D04H 1/00 (2006.01)
- B32B 3/00 (2006.01)
- B32B 3/26 (2006.01)
- E04B 1/74 (2006.01)

(52) U.S. Cl.
USPC .......... 264/122; 428/312.6; 428/331; 252/62; 106/600

(58) Field of Classification Search
USPC ...................... 428/312.2, 312.6, 331; 252/62; 264/109, 122; 106/38.9, 600, 611, 612, 106/624

See application file for complete search history.

(56) References Cited

U.S. PATENT DOCUMENTS

| | | | |
|---|---|---|---|
| 4,446,040 A * | 5/1984 | Samanta | 252/62 |
| 4,455,246 A * | 6/1984 | Schmidt et al. | 252/62 |
| 6,143,400 A | 11/2000 | Schwertfeger et al. | |
| 6,887,563 B2 | 5/2005 | Frank et al. | |
| 6,987,076 B1 * | 1/2006 | Jubb et al. | 501/35 |
| 2002/0045528 A1 | 4/2002 | Kusuno et al. | |
| 2003/0130104 A1 | 7/2003 | Kusuno et al. | |
| 2006/0094583 A1 * | 5/2006 | Freeman et al. | 501/36 |
| 2007/0049481 A1 | 3/2007 | Asano et al. | |
| 2007/0281565 A1 * | 12/2007 | de Souza | 442/172 |

FOREIGN PATENT DOCUMENTS

| | | |
|---|---|---|
| CA | 2231428 A1 | 3/1997 |
| CN | 1594197 A | 3/2005 |
| JP | A-1-145497 | 6/1989 |
| JP | A-11-513349 | 11/1999 |
| JP | A-11-514959 | 12/1999 |
| JP | A-2002-68777 | 3/2002 |
| JP | A-2002-524385 | 8/2002 |

(Continued)

OTHER PUBLICATIONS

Kammler et al. Structure of Flame-Made Silica Nanoparticles by Ultra-Small-Angle X-ray Scattering. Langmuir 2004, 20, 1915-1921.*

(Continued)

*Primary Examiner* — Noah Wiese
(74) *Attorney, Agent, or Firm* — Oliff & Berridge, PLC

(57) ABSTRACT

Provided is a thermal insulation having both excellent thermal insulating performance and excellent strength, and a method of producing the same. A method of producing a thermal insulation according to the present invention includes curing (S2) a dry-pressed compact including silica fine particles each having an average particle diameter of 50 nm or less and an alkaline-earth silicate fiber at a relative humidity of 70% or more.

12 Claims, 4 Drawing Sheets

(56) References Cited

FOREIGN PATENT DOCUMENTS

| | | |
|---|---|---|
| JP | A-2003-73926 | 3/2003 |
| JP | A-2007-63078 | 3/2007 |
| JP | A-2007-197264 | 8/2007 |

OTHER PUBLICATIONS

Jan. 16, 2013 Office Action issued in Chinese Patent Application No. 201010511713.6 (with concise explanation of relevance).

Jul. 2, 2013 Japanese Office Action issued in Japanese Patent Application No. 2009-239327 (with partial translation).

Japanese Patent Office, Partial English language Translation in Japanese Patent Application No. 2009-239327 dated Jul. 2, 2013.

Sep. 6, 2013 Notification of Second Office Action issued in Chinese Application No. 201010511713.6 with English-language translation.

* cited by examiner

FIG.4

| | SILICA FINE PARTICLE (wt%) | SILICON CARBIDE (wt%) | ALKALINE-EARTH SILICATE FIBER (wt%) | GLASS FIBER (wt%) | BULK DENSITY (kg/m³) | COMPRESSIVE STRENGTH (MPa) | THERMAL CONDUCTIVITY (W/(m·K)) (600°C) | WORKABILITY | COMPREHENSIVE EVALUATION |
|---|---|---|---|---|---|---|---|---|---|
| EXAMPLE 1 | 77 | 20 | 3 | 0 | 250 | 0.65 | 0.028 | GOOD | ○ |
| EXAMPLE 2 | 75 | 20 | 5 | 0 | 250 | 0.81 | 0.030 | GOOD | ○ |
| EXAMPLE 3 | 73 | 20 | 7 | 0 | 250 | 0.58 | 0.032 | GOOD | ○ |
| EXAMPLE 4 | 71 | 20 | 9 | 0 | 250 | 0.52 | 0.035 | ACCEPTABLE | ○ |
| EXAMPLE 5 | 68 | 20 | 12 | 0 | 250 | 0.45 | 0.038 | ACCEPTABLE | ○ |
| EXAMPLE 6 | 72 | 20 | 5 | 3 | 250 | 0.67 | 0.033 | EXCELLENT | ○ |
| EXAMPLE 7 | 70 | 20 | 5 | 5 | 250 | 0.78 | 0.035 | EXCELLENT | ◎ |
| COMPARATIVE EXAMPLE 1 | 80 | 20 | 0 | 0 | UNABLE TO BE FORMED | — | — | UNACCEPTABLE | × |
| COMPARATIVE EXAMPLE 2 | 77 | 20 | 0 | 3 | 250 | 0.36 | 0.027 | ACCEPTABLE | △ |
| COMPARATIVE EXAMPLE 3 | 75 | 20 | 0 | 5 | 250 | 0.39 | 0.029 | ACCEPTABLE | △ |
| COMPARATIVE EXAMPLE 4 | 73 | 20 | 0 | 7 | 250 | 0.32 | 0.031 | ACCEPTABLE | △ |
| COMPARATIVE EXAMPLE 5 | 71 | 20 | 0 | 9 | 250 | 0.29 | 0.033 | UNACCEPTABLE | × |
| COMPARATIVE EXAMPLE 6 | 68 | 20 | 0 | 12 | 250 | 0.25 | 0.037 | UNACCEPTABLE | × |

THERMAL INSULATION AND METHOD OF PRODUCING THE SAME

CROSS-REFERENCE TO RELATED APPLICATION

The present application claims priority from Japanese patent application JP 2009-239327, filed on Oct. 16, 2009, the content of which is hereby incorporated by reference into this application.

BACKGROUND OF THE INVENTION

1. Field of the Invention

The present invention relates to a thermal insulation and a method of producing the same, and more particularly, to an improvement in the strength of a thermal insulation.

2. Description of the Related Art

Conventionally, as thermal insulations having low thermal conductivity and being excellent in thermal insulating performance, there have been known ones which are obtained by mixing silica fine particles as a material having a low thermal conductivity, an inorganic fiber, and a binder, and then subjecting the mixture to press forming, followed by machining (for example, JP 11-513349 A and JP 11-514959 A).

However, the above-mentioned conventional technologies have involved a problem in that use of the binder requires, for example, removal of oil, which causes reduction in the strength of the thermal insulations. In addition, the use of the binder increases environmental impact. As described above, there has been a problem in that the removal of oil or the like involves increases in the number of steps and required time and energy when the binder is used.

In contrast, it is also possible to enhance the strength of a thermal insulation by increasing the density of the thermal insulation through the adjustment of pressing pressure without use of a binder. However, this case has involved a problem, for example, in that the thermal insulating performance of the thermal insulation lowers because the increase in the density of the thermal insulation involves an increase in the solid heat transfer.

SUMMARY OF THE INVENTION

The present invention has been made in view of the above-mentioned problems. An object of the present invention is to provide a thermal insulation having both excellent thermal insulating performance and excellent strength, and a method of producing the same.

A method of producing a thermal insulation according to one embodiment of the present invention for solving the above-mentioned problems includes curing a dry-pressed compact including silica fine particles, each having an average particle diameter of 50 nm or less, and an alkaline-earth silicate fiber at a relative humidity of 70% or more. According to the present invention, there can be provided a method of producing a thermal insulation having both excellent thermal insulating performance and excellent strength.

Further, the dry-pressed compact may be free of a binder. Further, the dry-pressed compact may include 50 to 98 mass % of the silica fine particles and 2 to 20 mass % of the alkaline-earth silicate fiber.

A thermal insulation according to one embodiment of the present invention for solving the above-mentioned problems is produced by any one of the methods described above. According to the present invention, there can be provided a thermal insulation having both excellent thermal insulating performance and excellent strength.

A thermal insulation according to one embodiment of the present invention for solving the above-mentioned problems includes silica fine particles each having an average particle diameter of 50 nm or less and an alkaline-earth silicate fiber. According to the present invention, there can be provided a thermal insulation having both excellent thermal insulating performance and excellent strength.

Further, the thermal insulation may have a bulk density of 190 to 600 $kg/m^3$ and a compressive strength of 4 MPa or more. Further, the thermal insulation may be free of a binder. Further, the thermal insulation may include 50 to 98 mass % of the silica fine particles and 2 to 20 mass % of the alkaline-earth silicate fiber. Further, the thermal insulation may have a thermal conductivity at 600° C. of 0.05 W/(m·K) or less.

According to the present invention, there can be provided thermal insulations each having both excellent thermal insulating performance and excellent strength, and the methods of producing a thermal insulation.

BRIEF DESCRIPTION OF THE DRAWINGS

In the accompanying drawings:

FIG. 4 shows one example of results in an example according to one embodiment of the present invention.

DETAILED DESCRIPTION OF THE INVENTION

Hereinafter, one embodiment of the present invention is described. Note that the present invention is not limited to this embodiment.

First, a method of producing a thermal insulation according to this embodiment (hereinafter referred to as "method of this embodiment") is described. The method of this embodiment is a method of producing a thermal insulation involving curing a dry-pressed compact including silica fine particles each having an average particle diameter of 50 nm or less and an alkaline-earth silicate fiber at a relative humidity of 70% or more.

Figure 1:
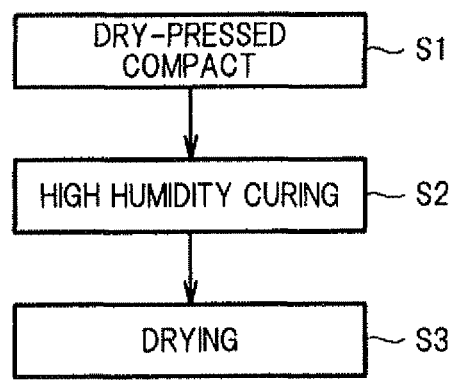
FIG. 1 is an explanatory diagram illustrating main steps included in one example of a method of producing a thermal insulation according to one embodiment of the present invention.

FIG. 1 is an explanatory diagram illustrating main steps included in one example of the method of this embodiment. In the example illustrated in FIG. 1, the method of this embodiment includes a preparation step S1 of preparing the dry-pressed compact, a curing step S2 of curing the dry-pressed compact at high humidity, and a drying step S3 of drying the dry-pressed compact after the curing.

In the preparation step S1, a raw material for a thermal insulation including silica fine particles and an alkaline-earth silicate fiber is prepared. The silica fine particles are not particularly limited as long as each the silica fine particles each have an average particle diameter of 50 nm or less. Any one kind of silica fine particles may be used alone, or two or more kinds of silica fine particles may be used in optional combination.

That is, it is possible to use, as the silica fine particles, for example, dry silica fine particles (anhydrous silica fine particles) produced by a gas phase method or wet silica fine particles produced by a wet method. In particular, the dry silica fine particles can be preferably used. To be specific, it is possible to preferably use, for example, fumed silica fine particles produced by the gas phase method. In particular, hydrophilic fumed silica fine particles can be preferably used.

The average particle diameter of the silica fine particles can be set more specifically to, for example, 5 nm or more and 50 nm or less. The silica ($SiO_2$) content of the silica fine particles is preferably, for example, 95 wt % or more. The thermal conductivity at 25° C. of the silica fine particles is preferably, for example, 0.01 W/(m·K) or less. The specific surface area of the silica fine particles by a BET method is preferably, for example, 50 $m^2$/g or more. To be more specific, the specific surface area can be set to, for example, 50 $m^2$/g or more and 400 $m^2$/g or less or can be set more preferably to 100 $m^2$/g or more and 300 $m^2$/g or less.

The alkaline-earth silicate fiber is not particularly limited as long as the alkaline-earth silicate fiber has a soluble property (degradable property) of being degraded in the body even if inhaled into the lung. Any one kind of alkaline-earth silicate fiber may be used alone, or two or more kinds of alkaline-earth silicate fibers may be used in optional combination.

That is, it is possible to preferably use, for example, an alkaline-earth silicate fiber that has a dissolution rate of 1% or more in a physiological saline at 40° C. and has a heat shrinkage rate of 5% or less after an 8-hour heating treatment at 1000° C.

To be specific, it is possible to use, for example, an alkaline-earth silicate fiber including 20 to 40 wt % of CaO and MgO in total, and 60 to 80 wt % of $SiO_2$.

Further, it is possible to use, for example, such an alkaline-earth silicate fiber as described in Japanese patent application. Laid-open No. 2002-68777 A, which includes $SiO_2$, MgO, and $TiO_2$ as essential components and includes an amorphous part made up of the components in its structure.

Further, it is possible to use, for example, such an alkaline-earth silicate fiber as described in Japanese patent application Laid-open No. 2003-73926 A, which includes $SiO_2$, MgO, and a manganese oxide as essential components and including an amorphous part made up of the components in its structure.

Further, it is possible to use, for example, such an alkaline-earth silicate fiber as described in Japanese patent application Laid-open No. 2007-63078 A, which includes 60 to 80 wt % of $SiO_2$, 5 to 20 wt % of MgO, 5 to 30 wt % of CaO, 0.5 to 5 wt % of $Al_2O_3$, and 0.1 to 5 wt % of BaO.

Further, it is possible to use, for example, an alkaline-earth silicate fiber including 19 to 25 wt % of CaO and MgO in total, 75 to 80 wt % of $SiO_2$, and 1.0 to 3.0 wt % of $Al_2O_3$.

The thermal conductivity of the alkaline-earth silicate fiber at 600° C. is, for example, preferably 0.2 W/(m·K) or less or more preferably 0.15 W/(m·K) or less. The fiber length of the alkaline-earth silicate fiber is not particularly limited, and is, for example, preferably 1 mm or more and 200 mm or less, more preferably 2 mm or more and 50 mm or less, or particularly preferably 10 mm or more and 50 mm or less. The average fiber diameter of the alkaline-earth silicate fiber is preferably, for example, 50 μm or less. To be more specific, the average fiber diameter is, for example, preferably 1.5 μm or more and 10 μm or less, or more preferably 2 μm or more and 6 μm or less.

Note that the dissolution rate of the alkaline-earth silicate fiber in a physiological saline can be measured, for example, in the following manner. That is, first, the alkaline-earth silicate fiber is pulverized so as to have a size equal to or smaller than a 200 mesh size, thereby preparing a sample, and after 1 g of the sample and 150 mL of a physiological saline are fed into an Erlenmeyer flask (having a volume of 300 mL), the Erlenmeyer flask is placed in an incubator. Next, a horizontal vibration is applied to the Erlenmeyer flask at 120 revolutions per minute for 50 hours, followed by filtration. Then, elements contained in the filtrate are quantified by using an inductively coupled plasma (ICP) emission spectrometer. Based on the quantified contents of the elements, and the composition and weight of the original sample, there is determined the dissolution rate that represents a ratio of the amounts of elements that have eluted from the original sample into the filtrate (weight reduction ratio of the sample because of dissolution).

Further, the heat shrinkage rate of the alkaline-earth silicate fiber can be measured in accordance with JIS R 3311, for example, in the following manner. Pieces of the alkaline-earth silicate fiber are accumulated to produce an aggregate having a thickness of 25 mm. Then, a test piece having a size of 150 mm long and 100 mm wide is cut from the aggregate. Platinum pins are embedded at predetermined positions in the test piece to be used as marks, and the distance between the marks is measured. Next, the test piece is subjected to a heat treatment at 1000° C. for 8 hours and then cooled to normal temperature. After that, the distance between the marks is measured again. Next, the measurement results are used to calculate the heat shrinkage rate based on the following equation: "heat shrinkage rate (%)={(distance before heat treatment)−(distance after heat treatment)}/(distance before heat treatment)×100."

The dry-pressed compact can be produced by mixing such silica fine particles and alkaline-earth silicate fiber as described above in a dry manner to produce a dry mixture, and then subjecting the dry mixture to dry-press forming.

To be specific, the dry-pressed compact is produced, for example, by subjecting a raw material for a thermal insulation including a dry powder of silica fine particles and a dry powder of an alkaline-earth silicate fiber to dry mixing by using a predetermined mixing apparatus, and then filling a predetermined forming mold with the resultant dry mixture to carry out dry-press forming. Note that mixing and forming in a dry system facilitate the control of the raw material and compact, and can effectively reduce a time required for production, compared with mixing and forming in a wet system.

The dry-pressed compact, for example, may include 50 to 98 mass % of the silica fine particles and 2 to 20 mass % of the alkaline-earth silicate fiber, or may preferably include 65 to 80 mass % of the silica fine particles and 2 to 18 mass % of the alkaline-earth silicate fiber.

Further, when the dry-pressed compact includes only the silica fine particles and the alkaline-earth silicate fiber, the dry-pressed compact, for example, may include 80 to 98 mass % of the silica fine particles and 2 to 20 mass % of the alkaline-earth silicate fiber so that the total content thereof reaches 100 mass %, may preferably include 82 to 98 mass % of the silica fine particles and 2 to 18 mass % of the alkaline-earth silicate fiber so that the total content thereof reaches 100 mass %, or may more preferably include 85 to 97 mass % of the silica fine particles and 3 to 15 mass % of the alkaline-earth silicate fiber so that the total content thereof reaches 100 mass %.

When the content of the alkaline-earth silicate fiber is less than 2 mass %, the strength of the thermal insulation may be insufficient. When the content of the alkaline-earth silicate fiber is more than 20 mass %, the powder flow property of the raw material for a thermal insulation at the time of forming may be impaired. As a result, reduction in the formability may occur and the density irregularity may cause reduction in the workability.

Further, the dry-pressed compact may be free of a binder. That is, in the method of this embodiment, the strength of the thermal insulation can be effectively improved by a curing treatment described later, and hence it is not necessary to use a binder. In this case, the dry-pressed compact is substantially free of a binder that has been conventionally used, such as an inorganic binder, such as a water glass adhesive, or an organic binder, for example, a resin. Thus, conventional problems involved in the use of binders can be reliably avoided. Further, in this case, dry-press forming is not particularly limited, and can be carried out, for example, at a temperature of 5° C. or more and 60° C. or less.

Further, the dry-pressed compact may also include other components. That is, the dry-pressed compact may further include, for example, another reinforcement fiber in addition to the alkaline-earth silicate fiber. The other reinforcement fiber is not particularly limited as long as it can reinforce a thermal insulation, and at least one of an inorganic fiber and an organic fiber may be used.

The inorganic fiber to be used as the other reinforcement fiber is not particularly limited as long as the inorganic fiber can be used as a reinforcement fiber. Any one kind of inorganic fiber may be used alone, or two or more kinds of inorganic fibers may be used in optional combination. To be specific, it is possible to use at least one kind of inorganic fiber selected from the group consisting of, for example, a silica-alumina fiber, a silica fiber, an alumina fiber, a zirconia fiber, a glass fiber, rock wool, and a basalt fiber.

The thermal conductivity of the inorganic fiber at 400° C. is, for example, preferably 0.08 W/(m·K) or less, or more preferably 0.04 W/(m·K) or less. It is possible to preferably use, for example, a silica-based fiber such as a silica-alumina fiber or a, silica fiber as the inorganic fiber with low thermal conductivity described above.

The fiber length of the inorganic fiber is, for example, preferably 1 mm or more and 10 mm or less, more preferably 1 mm or more and 7 mm or less, or particularly preferably 3 mm or more and 5 mm or less. When the fiber length is less than 1 mm, it may be impossible to suitably align the inorganic fiber. As a result, the mechanical strength of the thermal insulation may be insufficient. When the fiber length is more than 10 mm, the powder flow property of the raw material for a thermal insulation at the time of forming may be impaired. As a result, reduction in the formability may occur and density irregularity may cause reduction in the workability.

The average fiber diameter of the inorganic fiber is preferably, for example, 15 μm or less. To be more specific, the average fiber diameter is preferably, for example, 5 μm or more and 15 μm or less. When the average fiber diameter is more than 15 μm, the inorganic fiber becomes liable to break in some cases. As a result, the strength of the thermal insulation may be insufficient. Thus, it is possible to preferably use, for example, an inorganic fiber having a fiber length of 1 mm or more and 10 mm or less and having an average fiber diameter of 15 μm or less as the inorganic fiber.

The organic fiber to be used as the other reinforcement fiber is not particularly limited as long as the organic fiber can be used as a reinforcement fiber. Any one kind of organic fiber may be used alone, or two or more kinds of organic fibers may be used in optional combination. To be specific, it is possible to use at least one kind of organic fiber selected from the group consisting of, for example, an aramid fiber, a polyethylene fiber, a polypropylene fiber, and a polyolefin fiber.

The fiber length of the organic fiber is, for example, preferably 1 mm or more and 10 mm or less, more preferably 2 mm or more and 7 mm or less, or particularly preferably 3 mm or more and 5 mm or less. When the fiber length is less than 1 mm, it may be impossible to suitably align the organic fiber. As a result, the mechanical strength of the thermal insulation may be insufficient. When the fiber length is more than 10 mm, the powder flow property of the raw material for a thermal insulation at the time of forming may be impaired. As a result, reduction in the formability may occur and density irregularity may cause reduction in the workability.

The average fiber diameter of the organic fiber is preferably, for example, 15 μm or less. To be more specific, the average fiber diameter is preferably, for example, 5 μm or more and 15 μm or less. When the average fiber diameter is more than 15 μm, the organic fiber becomes liable to break in some cases. As a result, the strength of the thermal insulation may be insufficient. Thus, it is possible to preferably use, for example, an organic fiber having a fiber length of 1 mm or more and 10 mm or less and having an average fiber diameter of 15 μm or less as the organic fiber.

When the other reinforcement fiber is used, the dry-pressed compact, for example, may include 50 to 98 mass % of the silica fine particles, 0.5 to 19.5 mass % of the alkaline-earth silicate fiber, and 0.5 to 19.5 mass % of the another reinforcement fiber, and may preferably include 65 to 80 mass % of the silica fine particles, 1 to 18 mass % of the alkaline-earth silicate fiber, and 1 to 18 mass % of the another reinforcement fiber.

The dry-pressed compact may also include, for example, a thermal radiation scattering material. The thermal radiation scattering material is not particularly limited as long as the thermal radiation scattering material can reduce heat transfer caused by thermal radiation. Any one kind of thermal radiation scattering material may be used alone, or two or more kinds of thermal radiation scattering materials may be used in optional combination.

To be specific, it is possible to use at least one kind of thermal radiation scattering material selected from the group consisting of silicon carbide, zirconia, and titania. Further, the thermal radiation scattering material preferably has an average particle diameter of, for example, 50 μm or less, or to be more specific, 1 to 50 μm, and has a specific refractive index of, for example, 1.25 or more with respect to the light having a wavelength of 1 µm or more.

When the thermal radiation scattering material is used, the dry-pressed compact, for example, may include 50 to 93 mass % of the silica fine particles, 2 to 20 mass % of the alkaline-earth silicate fiber, and 5 to 40 mass % of the thermal radiation scattering material or may preferably include 65 to 80 mass % of the silica fine particles, 5 to 18 mass % of the alkaline-earth silicate fiber, and 15 to 30 mass % of the thermal radiation scattering material.

Further, when the other reinforcement fiber and the thermal radiation scattering material are used, the dry-pressed compact, for example, may include 50 to 93 mass % of the silica fine particles, 0.5 to 9.5 mass % of the alkaline-earth silicate fiber, 0.5 to 9.5 mass % of the other reinforcement fiber, and 5 to 40 mass % of the thermal radiation scattering material, or may preferably include 65 to 80 mass % of the silica fine particles, 2 to 8 mass % of the alkaline-earth silicate fiber, 2 to 8 mass % of the other reinforcement fiber, and 15 to 30 mass % of the thermal radiation scattering material.

In the subsequent curing step S2, the dry-pressed compact prepared in the preparation step S1 is cured under the relative humidity of 70% or more. The relative humidity in the curing may be set, for example, to 75% or more, to 80% or more, or even to 85% or more. Further, the curing may also be carried out at a relative humidity of more than 85%.

The curing is carried out by keeping the dry-pressed compact for a predetermined time under such a high humidity environment as described above. To be specific, the dry-pressed compact can be subjected to high humidity curing, for example, by placing the dry-pressed compact in a thermo-hygrostat in which temperature and humidity are each set to a predetermined value, or in an autoclave in which arrival temperature is set to a predetermined value, and leaving the dry-pressed compact to stand for a predetermined time.

The temperature at which the curing is carried out may be arbitrarily set within a range in which the effect of the curing can be provided. To be specific, the curing temperature, for example, may be set to 40° C. or more, is set to preferably 60° C. or more, more preferably 80° C. or more, or particularly preferably 90° C. or more. By increasing the curing temperature, it is possible to reduce the curing time until the effect of the curing is provided. The upper limit of the curing temperature is not particularly limited and can be set to, for example, 95° C. or less. Note that the curing temperature may preferably be set to 100° C. or less, or less than 100° C. in some cases.

Further, the curing may also be carried out under a pressurized condition. In this case, the curing temperature may be arbitrarily set within a range in which the effect of the curing can be provided. To be specific, the curing temperature under a pressurized condition, for example, may be set to 100 to 200° C. or may be even set to 120 to 170° C. By carrying out the curing under such a pressurized condition as described above, it is expected to reduce the curing time until the effect of the curing is provided.

The time for carrying out the curing may be arbitrarily set within a range in which the effect of the curing can be provided. To be specific, the curing time, for example, may be set to 2 hours or more, or is preferably set to 6 hours or more. Increasing the curing time can lead to the enhancement of the effect of the curing.

Note that curing conditions are not limited to the above-mentioned examples, and may be arbitrarily set within a range in which the effect of the curing can be provided. That is, the curing conditions may be suitably adjusted, for example, so that the strength (for example, compressive strength) and thermal conductivity of the thermal insulation produced by the method of this embodiment fall within such predetermined ranges as described later.

In the subsequent drying step S3, the dry-pressed compact cured in the curing step S2 is dried. That is, water is removed in the drying step 33, the water having penetrated into the dry-pressed compact at the time of the curing and being derived from water vapor. The drying method is not particularly limited as long as the drying method can remove unnecessary water from the dry-pressed compact. That is, for example, by keeping the dry-pressed compact at a temperature of 100° C. or more, the dry-pressed compact can be dried efficiently.

In the method of this embodiment, the dry-pressed compact having gone through the curing and the drying is thus finally obtained as a thermal insulation. According to the method of this embodiment, it is possible to produce a thermal insulation having both excellent thermal insulating performance and excellent strength. That is, according to the method of this embodiment, it is possible to effectively improve the strength of a thermal insulation without increasing the density of the thermal insulation. Further, according to the method of this embodiment, it is possible to produce a thermal insulation having sufficient strength without using a binder.

Figure 2A:
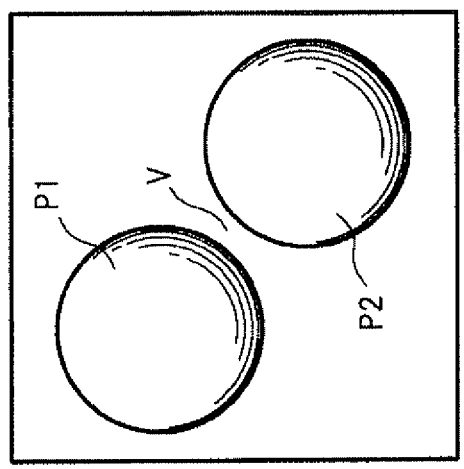
FIG. 2A is an explanatory diagram of a part of one example of a mechanism by which the strength of a thermal insulation is improved by curing in the method of producing a thermal insulation according to one embodiment of the present invention.
Figure 2B:
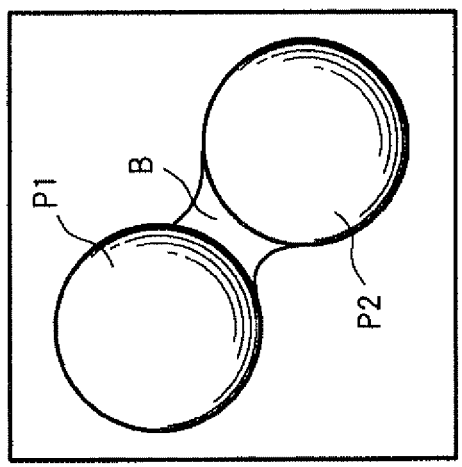
FIG. 2B is an explanatory diagram of another part of one example of the mechanism by which the strength of the thermal insulation is improved by the curing in the method of producing a thermal insulation according to one embodiment of the present invention.
Figure 2C:
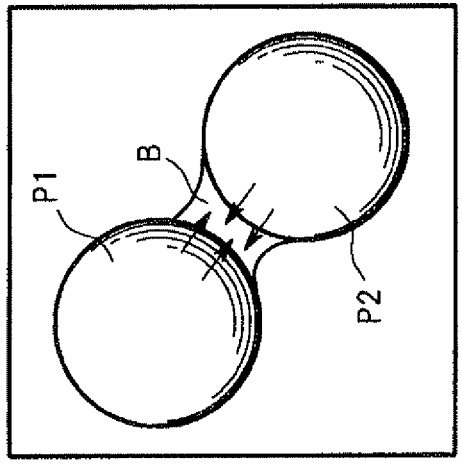
FIG. 2C is an explanatory diagram of still another part of one example of the mechanism by which the strength of the thermal insulation is improved by the curing in the method of producing a thermal insulation according to one embodiment of the present invention.

FIGS. 2A to 2C are explanatory diagrams of one example of a mechanism by which the strength of a thermal insulation is improved by high humidity curing in the method of this embodiment. Here, as illustrated in FIGS. 2A to 2C, attention is focused on two adjacent silica fine particles P1 and P2 out of the silica fine particles included in the dry-pressed compact, to thereby describe the mechanism. As the mechanism by which the strength of a thermal insulation is improved by high humidity curing, the following mechanism is considered.

That is, first, as illustrated in FIG. 2A, an extremely fine gap V (for example, an ultrafine pore having a size of about several nm) is present between the silica fine particles P1 and P2 included in the dry-pressed compact before curing. Next, curing in which the dry-pressed compact is kept under a high humidity atmosphere is started. Then, as illustrated in FIG. 2B, capillary condensation of water vapor forms a bridge structure B formed of a liquid containing condensed water as a main component between the silica fine particles P1 and P2.

Further, the dry-pressed compact is successively kept under the high humidity atmosphere. Then, as illustrated in FIG. 2C with arrows, silica is eluted from the silica fine particles P1 and P2, forming the bridge structure B containing the eluted silica between the silica fine particles P1 and P2. The elution reaction of silica must be the following silicate reaction: "$SiO_2 + 2H_2O \rightarrow H_4SiO_4 \rightarrow H^+ + H_3SiO_4^-$."

Further, as the dry-pressed compact includes an alkaline-earth silicate fiber, the elution of silica from the silica fine particles P1 and P2 can be effectively promoted inside the dry-pressed compact. The bridge structure B formed between the silica fine particles P1 and P2 may also include an alkaline-earth metal derived from the alkaline-earth silicate fiber in addition to silica.

Next, the dry-pressed compact after the curing is dried. Then, the bridge structure B formed between the silica fine particles P1 and P2 is hardened. The formation of the bridge structure B described above can enhance the strength of the thermal insulation effectively. Note that a similar bridge structure is also formed between a silica fine particle and an alkaline-earth silicate fiber.

Figure 3A:
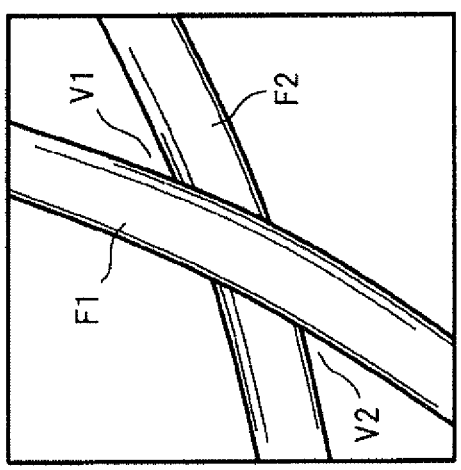
FIG. 3A is an explanatory diagram of apart of another example of the mechanism by which the strength of the thermal insulation is improved by the curing in the method of producing a thermal insulation according to one embodiment of the present invention.
Figure 3B:
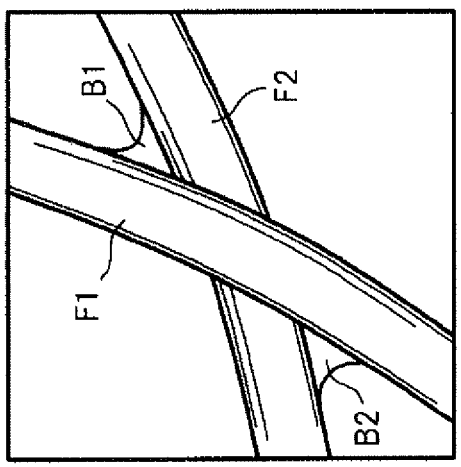
FIG. 3B is an explanatory diagram of another part of another example of the mechanism by which the strength of the thermal insulation is improved by the curing in the method of producing a thermal insulation according to one embodiment of the present invention.
Figure 3C:
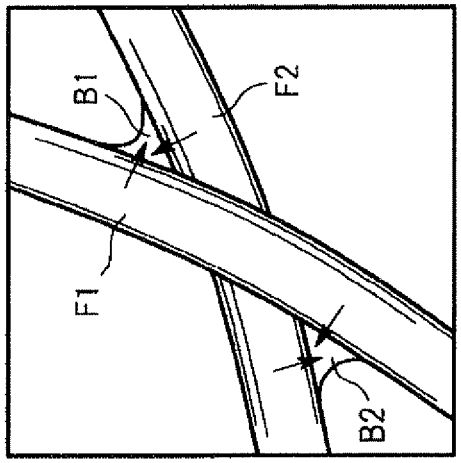
FIG. 3C is an explanatory diagram of still another part of another example of the mechanism by which the strength of the thermal insulation is improved by the curing in the method of producing a thermal insulation according to one embodiment of the present invention.

FIGS. 3A to 3C are explanatory diagrams of a mechanism by which the strength of a thermal insulation is improved by high humidity curing in the method of this embodiment. Here, as illustrated in FIGS. 3A to 3C, attention is focused on two adjacent alkaline-earth silicate fiber pieces F1 and F2 out of the alkaline-earth silicate fiber included in the dry-pressed compact, to thereby describe the mechanism. As the mechanism by which the strength of a thermal insulation is improved by high humidity curing, the following mechanism is considered.

That is, first, as illustrated in FIG. 3A, fine gaps V1 and V2 are present between the alkaline-earth silicate fiber pieces F1 and F2 included in the dry-pressed compact before curing. Next, curing in which the dry-pressed compact is kept under a high humidity atmosphere is started. Then, as illustrated in FIG. 3B, capillary condensation of water vapor forms bridge structures B1 and B2 each formed of a liquid containing condensed water as a main component between the alkaline-earth silicate fiber pieces F1 and F2.

Further, the dry-pressed compact is continuously kept under the high humidity atmosphere. Then, as illustrated in FIG. 3C with arrows, components elute from the alkaline-earth silicate fiber pieces F1 and F2, forming the bridge structures B1 and B2 containing the eluted components at the contact points between the alkaline-earth silicate fiber pieces F1 and F2. The bridge structures B1 and B2 may include, for example, an alkaline-earth metal derived from the alkaline-earth silicate fiber.

Next, the dry-pressed compact after the curing is dried. Then, the bridge structures B1 and B2 formed at the contact points between the alkaline-earth silicate fiber pieces F1 and F2 are hardened. The formation of the bridge structures described above can enhance the strength of the thermal insulation effectively.

A thermal insulation according to this embodiment (hereinafter referred to as "thermal insulation of this embodiment") can be preferably produced by the method of this embodiment described above. The thermal insulation of this embodiment can have sufficient strength while having relatively low density. That is, the thermal insulation of this embodiment can be, for example, a thermal insulation including silica fine particles each having an average particle diameter of 50 nm or less and an alkaline-earth silicate fiber.

Further, the thermal insulation of this embodiment may also be a thermal insulation having a bulk density of 190 to 600 kg/m$^3$ and having a compressive strength of 0.4 MPa or more. In this case, the bulk density of the thermal insulation of this embodiment may be also set to, for example, 190 to 450 kg/m$^3$ or 190 to 300 kg/m$^3$. The compressive strength of the thermal insulation of this embodiment may be also set to, for example, 0.5 MPa or more or 0.55 MPa or more. Note that the compressive strength can be measured by using a predetermined compression testing apparatus such as a commercially available universal testing apparatus (TENSILON RTC-1150A, Orientec Co., Ltd.). To be specific, for example, a test piece obtained by cutting the thermal insulation of this embodiment so that the test piece has a dimension of 30 mm×30 mm×15 mm is loaded with a weight on the press surface (30 mm×30 mm) in the direction perpendicular to the press surface, and the weight of the load (MPa) at the time of fracture of the test piece is defined as the compressive strength. When the thermal insulation of this embodiment has a plate shape, the compressive strength can be evaluated as compressive strength in the thickness direction of the thermal insulation of this embodiment (that is, fracture strength at the time when a pair of surfaces extending in the longitudinal direction and having the largest area are compressed).

The thermal insulation of this embodiment, for example, may include 50 to 98 mass % of the silica fine particles and 2 to 20 mass % of the alkaline-earth silicate fiber, or may preferably include 65 to 80 mass % of the silica fine particles and 2 to 18 mass % of the alkaline-earth silicate fiber.

Further, when the thermal insulation of this embodiment includes only the silica fine particles and the alkaline-earth silicate fiber, the thermal insulation of this embodiment, for example, may include 80 to 98 mass % of the silica fine particles and 2 to 20 mass % of the alkaline-earth silicate fiber so that the total content thereof reaches 100 mass %, may preferably include 82 to 98 mass % of the silica fine particles and 2 to 18 mass % of the alkaline-earth silicate fiber so that the total content thereof reaches 100 mass %, or may more preferably include 85 to 97 mass % of the silica fine particles and 3 to 15 mass % of the alkaline-earth silicate fiber so that the total content thereof reaches 100 mass %.

When the content of the alkaline-earth silicate fiber is less than 2 mass %, the strength of the thermal insulation of this embodiment may be insufficient. When the content of the alkaline-earth silicate fiber is more than 20 mass %, the powder flow property of the raw material for the thermal insulation of this embodiment at the time of forming may be impaired. As a result, reduction in the formability may occur and the density irregularity may cause reduction in the workability.

Further, the thermal insulation of this embodiment may be free of a binder. That is, the thermal insulation of this embodiment can obtain enough strength by curing as described above, and hence it is not necessary to use a binder. In this case, the thermal insulation of this embodiment is substantially free of a binder that has been conventionally used, such as an inorganic binder, for example, a water glass adhesive or an organic binder, for example, a resin. Thus, conventional problems involved in the use of binders can be reliably avoided.

Further, the insulating material of this embodiment may also further include other components. That is, the insulating material of this embodiment may further include, for example, another reinforcement fiber in addition to the alkaline-earth silicate fiber. The other reinforcement fiber is not particularly limited as long as it can reinforce a thermal insulation, and at least one of an inorganic fiber and an organic fiber may be used.

The inorganic fiber to be used as the other reinforcement fiber is not particularly limited as long as the inorganic fiber can be used as a reinforcement fiber. Any one kind of inorganic fiber may be used alone, or two or more kinds of inorganic fibers may be used in optional combination. To be specific, it is possible to use at least one kind of inorganic fiber selected from the group consisting of, for example, a silica-alumina fiber, a silica fiber, an alumina fiber, a zirconia fiber, a glass fiber, rock wool, and a basalt fiber. Note that the alkaline-earth silicate fiber is a biosoluble inorganic fiber.

The thermal conductivity of the inorganic fiber at 400° C. is, for example, preferably 0.08 W/(m·K) or less or more preferably 0.04 W/(m·K) or less. It is possible to preferably use, for example, a silica-based fiber such as a silica-alumina fiber or a silica fiber as the inorganic fiber with low thermal conductivity described above.

The fiber length of the inorganic fiber is, for example, preferably 1 mm or more and 10 mm or less, more preferably 1 mm or more and 7 mm or less, or particularly preferably 3 mm or more and 5 mm or less. When the fiber length is less than 1 mm, it may be impossible to suitably align the inorganic fiber. As a result, the mechanical strength of the thermal insulation may be insufficient. When the fiber length is more than 10 mm, the powder flow property of the raw material for a thermal insulation at the time of forming may be impaired, a reduction in the formability may occur and density irregularity may cause reduction in the workability.

The average fiber diameter of the inorganic fiber is preferably, for example, 15 µm or less. To be more specific, the average fiber diameter is preferably, for example, 5 µm or more and 15 µm or less. When the average fiber diameter is more than 15 µm, the inorganic fiber may become liable to break in some cases. As a result, the strength of the thermal insulation may be insufficient. Thus, it is possible to preferably use an inorganic fiber having a fiber length of 1 mm or more and 10 mm or less and having an average fiber diameter of 15 µm or less as the inorganic fiber.

The organic fiber to be used as the other reinforcement fiber is not particularly limited as long as the organic fiber can be used as a reinforcement fiber. Any one kind of organic fiber may be used alone, or two or more kinds of organic fibers may be used in optional combination. To be specific, it is possible to use at least one kind of organic fiber selected from the group consisting of, for example, an aramid fiber, a polyethylene fiber, a polypropylene fiber, and a polyolefin fiber.

The fiber length of the organic fiber is, for example, preferably 1 mm or more and 10 mm or less, more preferably 2 mm or more and 7 mm or less, or particularly preferably 3 mm or more and 5 mm or less. When the fiber length is less than 1 mm, it may be impossible to suitably align the organic fibers. As a result, the mechanical strength of the thermal insulation may be insufficient. When the fiber length is more than 10 mm, the powder flow property of the raw material for a thermal insulation at the time of forming may be impaired, a reduction in the formability may occur and density irregularity may cause reduction in the workability.

The average fiber diameter of the organic fiber is preferably, for example, 15 µm or less. To be more specific, the average fiber diameter is preferably, for example, 5 µm or more and 15 µm or less. When the average fiber diameter is more than 15 µm, the organic fiber may become liable to break in some cases. As a result, the strength of the thermal insulation may be insufficient. Thus, it is possible to preferably use an organic fiber having a fiber length of 1 mm or more and 10 mm or less and having an average fiber diameter of 15 µm or less as the organic fiber.

When the other reinforcement fiber is used, the thermal insulation of this embodiment, for example, may include 50 to 98 mass % of the silica fine particles, 0.5 to 19.5 mass % of the alkaline-earth silicate fiber, and 0.5 to 19.5 mass % of the other reinforcement fiber, and may preferably include 65 to 80 mass % of the silica fine particles, 1 to 18 mass % of the alkaline-earth silicate fiber, and 1 to 18 mass % of the other reinforcement fiber.

The thermal insulation of this embodiment may also include, for example, a thermal radiation scattering material. The thermal radiation scattering material is not particularly limited as long as the thermal radiation scattering material can reduce heat transfer caused by thermal radiation. Any one kind of thermal radiation scattering material may be used alone, or two or more kinds of thermal radiation scattering materials may be used in optional combination.

To be specific, it is possible to use at least one kind of thermal radiation scattering material selected from the group consisting of silicon carbide, zirconia, and titania. Further, the thermal radiation scattering material preferably has an average particle diameter of, for example, 50 µm or less, or to be more specific, 1 to 50 µm, and has a specific refractive index of, for example, 1.25 or more with respect to light having a wavelength of 1 µm or more.

When the thermal radiation scattering material is used, the thermal insulation of this embodiment, for example, may include 50 to 93 mass % of the silica fine particles, 2 to 20 mass % of the alkaline-earth silicate fiber, and 5 to 40 mass % of the thermal radiation scattering material, or may preferably include 65 to 80 mass % of the silica fine particles, 5 to 18 mass % of the alkaline-earth silicate fiber, and 15 to 30 mass % of the thermal radiation scattering material.

Further, when the other reinforcement fiber and the thermal radiation scattering material are used, the thermal insulation of this embodiment, for example, may include 50 to 93 mass % of the silica fine particles, 0.5 to 9.5 mass % of the alkaline-earth silicate fiber, 0.5 to 9.5 mass % of the other reinforcement fiber, and 5 to 40 mass % of the thermal radiation scattering material, or may preferably include 65 to 80 mass % of the silica fine particles, 2 to 8 mass % of the alkaline-earth silicate fiber, 2 to 8 mass % of the other reinforcement fiber, and 15 to 30 mass % of the thermal radiation scattering material.

Further, the thermal insulation of this embodiment can have excellent thermal insulating performance. That is, the thermal insulation of this embodiment has obtained enough strength without increasing its density unlike conventional thermal insulations, and hence reduction in thermal insulating performance due to the increase of solid heat transfer can be effectively avoided. To be specific, the thermal insulation of this embodiment can be a thermal insulation having a thermal conductivity at 600° C. of 0.05 W/(m·K) or less. The thermal conductivity at 600° C. of the thermal insulation of this embodiment can also be preferably set to 0.04 W/(m·K) or less.

Note that the thermal insulation of this embodiment has a structure in which primary particles of the silica fine particles each having an average particle diameter of 50 nm or less assemble by an intermolecular force or the like to form secondary particles, which are dispersed among pieces of the alkaline-earth silicate fiber. Further, because silica fine particles are used in the thermal insulation of this embodiment, the thermal insulation of this embodiment internally has a structure of nanopores smaller than the mean free path of an air molecule, and hence the thermal insulation of this embodiment can exert excellent thermal insulating performance in a wide temperature range of from a low temperature region to a high temperature region.

Further, the thermal insulation of this embodiment may be a thermal insulation having a peculiar structure formed through high humidity curing. That is, the thermal insulation of this embodiment can be, for example, a thermal insulation including silica fine particles each having an average particle diameter of 50 nm or less and an alkaline-earth silicate fiber, and having a bridge structure containing silica between the silica fine particles. The bridge structure is, as described above, formed by capillary condensation of water vapor and contains silica eluted from the silica fine particles. The bridge structure may also include an alkaline-earth metal. That is, the bridge structure in this case includes the alkaline-earth metal derived from the alkaline-earth silicate fiber.

As described above, the thermal insulation of this embodiment can have both excellent thermal insulating performance and high strength while having relatively low density. Thus, the thermal insulation of this embodiment can be preferably utilized as, for example, a thermal insulation being used for a general industrial furnace and requiring processing, or a thermal insulation for a reformer of a fuel cell.

Next, specific examples according to this embodiment are described.

EXAMPLES

[Production of Thermal Insulation]

Seven kinds of thermal insulations were produced as Examples 1 to 7. That is, first, there was produced a dry-pressed compact including anhydrous silica fine particles (hydrophilic fumed silica fine particles) each having an average primary particle diameter of about 13 nm and having a thermal conductivity (25° C.) of 0.01 W/(m·K), and a bio-soluble alkaline-earth silicate fiber (fine FREX-E, NICHIAS Corporation). Note that the alkaline-earth silicate fiber had a dissolution rate of 3% in a physiological saline at 40° C. and had a heat shrinkage rate of 0.1% after an 8-hour heating treatment at 1000° C.

To be specific, 68 to 77 mass % of the silica fine particles, 3 to 12 mass % of the alkaline-earth silicate fiber, and 20 mass % of silicon carbide having an average particle diameter of 3 μm were fed into a mixing apparatus, and the mixture was subjected to dry mixing, to thereby yield a dry mixture including the silica fine particles, the alkaline-earth silicate fiber, and silicon carbide.

Further, 70 or 72 mass % of the silica fine particles, 5 mass % of the alkaline-earth silicate fiber, 20 mass % of silicon carbide, and 3 or 5 mass % of a heat-resistant glass fiber (having an average fiber diameter of 10 μm and an average fiber length of 3 mm) were fed into a mixing apparatus, and the mixture was subjected to dry mixing, to thereby yield a dry mixture including the silica fine particles, the alkaline-earth silicate fiber, silicon carbide, and the glass fiber.

The resultant dry-mixed powders were each used to produce a dry-pressed compact having a plate shape of 100 mm×150 mm and 15 mm in thickness by dry-press forming. In the dry-press forming, a pressing pressure was adjusted so as to provide the dry-pressed compact with a bulk density of 250 kg/m$^3$.

Next, the dry-pressed compacts were kept for 24 hours in a thermo-hygrostat at a temperature of 80° C. and at a relative humidity of 90%, to thereby carry out high humidity curing. Then, the dry-pressed compacts after the curing were dried at 105° C. to yield seven kinds of thermal insulations.

Further, six kinds of thermal insulations free of an alkaline-earth silicate fiber were produced as Comparative Examples 1 to 6 in the same manner as that in Examples 1 to 7 described above. That is, 68 to 80 mass % of the silica fine particles, 20 mass % of silicon carbide, and 0 to 12 mass % of the glass fiber were fed into a mixing apparatus, and the mixture was subjected to dry mixing.

The resultant dry-mixed powders were each used to produce a dry-pressed compact having a plate shape of 100 mm×150 mm and 15 mm in thickness by dry-press forming. In the dry-press forming, a pressing pressure was adjusted so as to provide the dry-pressed compact with a bulk density of 250 kg/m$^3$. Then, the resultant six kinds of thermal insulations obtained without being subjected to curing were used as thermal insulations according to Comparative Examples 1 to 6.

[Evaluation of Performance of Thermal Insulation]

The compressive strength of each thermal insulation was measured by using a universal testing apparatus (TENSILON RTC-1150A, Orientec Co., Ltd.). That is, a test piece obtained by cutting the thermal insulation so that the test piece had a dimension of 30 mm×30 mm×15 mm was loaded with a weight on the press surface (30 mm×30 mm) in the direction perpendicular to the press surface, and the weight of the load at the time of fracture of the test piece was defined as the compressive strength (MPa).

Further, the thermal conductivity of each thermal insulation at 600° C. was measured by a cyclic heat method. That is, a temperature wave was propagated in a test body, and the phase lag of the temperature wave was used to determine thermal diffusivity. Then, the thermal diffusivity and specific heat and density both separately measured were used to calculate the thermal conductivity. Note that the temperature wave which was used was a wave of temperature having the temperature amplitude of about 4° C. and having the period of about 1 hour. Further, a time required for the temperature wave to pass through from one point to another in the test body was defined as the phase lag. Further, based on evaluation criteria taking the balance between the ease of handling and thermal conductivity into consideration, each thermal insulation was comprehensively evaluated for how useful it is as a thermal insulation. As is well known, the cyclic heat method provides two kinds of ways for thermal diffusivity measurement; one is a way to measure the phase lag of the generated temperature wave which propagates through a specimen, the other is a way to measure the amplitude decay of the temperature wave. Anyhow the physical value obtained from these two ways is the thermal diffusivity of a specimen, so the thermal conductivity of the specimen is obtained by multiplying the specific heat and the bulk density by the thermal diffusivity.

FIG. 4 shows the composition, bulk density, compressive strength, thermal conductivity, workability, and comprehensive evaluation of each thermal insulation by relating them to each other. In the column "comprehensive evaluation" in FIG. 4, the symbol "double circle" denotes that a thermal insulation had a compressive strength of 0.8 MPa or more and a thermal conductivity of 0.04 W/(m·K) or less, and hence was evaluated to be able to be suitably used in practical applications, the symbol "single circle" denotes that a thermal insulation had a compressive strength of 0.6 MPa or more and a thermal conductivity of 0.04 W/(m·K) or less, and hence was evaluated to be able to be used without any problem in practical applications, the symbol "triangle" denotes that a thermal insulation had a compressive strength of 0.4 MPa or more and a thermal conductivity of 0.04 W/(m·K) or less, and hence was evaluated to be able to be used, though with some problems, in practical applications, and the symbol "cross" denotes that a thermal insulation had a compressive strength of 0.4 MPa or less and a thermal conductivity of 0.04 W/(m·K) or less, and hence was evaluated to be unable to be used in practical applications.

As shown in FIG. 4, a thermal insulation free of both the alkaline-earth silicate fiber and the glass fiber (Comparative Example 1) could not be produced by dry-press forming. Further, thermal insulations being free of the alkaline-earth silicate fiber and including the glass fiber (Comparative Examples 2 to 6) each had a low compressive strength and had problems for practical applications.

In contrast, thermal insulations including the alkaline-earth silicate fiber and being produced through high humidity curing (Examples 1 to 7) each had a remarkably increased compressive strength. That is, in any of thermal insulations including the alkaline-earth silicate fiber but being free of the glass fiber (Examples 1 to 5) and thermal insulations including the alkaline-earth silicate fiber and also including the glass fiber (Examples 6 and 7), it was possible to improve the compressive strength while keeping the density and thermal conductivity low. Each of those thermal insulations (Examples 1 to 7) was excellent in workability as well, and hence was evaluated in the comprehensive evaluation to have no problem in practical applications or be able to be favorably used.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A method of producing a thermal insulation, comprising curing a dry-pressed compact comprising silica fine particles, wherein the silica fine particles have an average particle diameter of 50 nm or less, and an alkaline-earth silicate fiber at a relative humidity of 70% or more.

2. The method of producing a thermal insulation according to claim 1, wherein the dry-pressed compact is free of a binder.

3. The method of producing a thermal insulation according to claim 1, wherein the dry-pressed compact comprises 50 to 98 mass % of the silica fine particles and 2 to 20 mass % of the alkaline-earth silicate fiber.

4. A thermal insulation, which is produced by the method according to claim 1, wherein the silica fine particles include adjacent silica fine particles that are separated by a bridge structure that extends between and connects the adjacent particles, and the bridge structure is formed of eluted silica comprising $H_4SiO_4$.

5. A thermal insulation, comprising silica fine particles wherein the silica fine particles have an average particle diameter of 50 nm or less and an alkaline-earth silicate fiber, wherein the silica fine particles include adjacent silica fine particles that are separated by a bridge structure that extends between and connects the adjacent particles, and the bridge structure is formed of eluted silica comprising $H_4SiO_4$.

6. The thermal insulation according to claim 5, wherein the thermal insulation has a bulk density of 190 to 600 kg/m3 and has a compressive strength of 0.4 MPa or more.

7. The thermal insulation according to claim 5, wherein the thermal insulation is free of a binder.

8. The thermal insulation according to claim 5, comprising 50 to 98 mass % of the silica fine particles and 2 to 20 mass % of the alkaline-earth silicate fiber.

9. The thermal insulation according to claim 5, wherein the thermal insulation has a thermal conductivity at 600° C. of 0.05 W/(m·K) or less.

10. The thermal insulation of claim 5, wherein the bridge structure further comprises an alkaline-earth metal.

11. The thermal insulation of claim 5, wherein the eluted silica is eluted in capillary water condensation from adjacent particles.

12. The thermal insulation of claim 5, wherein the bridge structure has a length of about several nanometers.

* * * * *